(12) United States Patent
Inamasu et al.

(10) Patent No.: US 8,622,661 B2
(45) Date of Patent: Jan. 7, 2014

(54) TOOL WITH INTERNAL FLUID PASSAGE

(75) Inventors: Yasuhiro Inamasu, Nara (JP); Morihiro Hideta, Nara (JP); Kazuo Maeda, Hyogo (JP); Hideo Mori, Hyogo (JP)

(73) Assignees: Mori Seiki Co., Ltd., Yamatokoriyama-shi (JP); Sumitomo Electric Hardmetal Corp., Itami-shi (JP)

( * ) Notice: Subject to any disclaimer, the term of this patent is extended or adjusted under 35 U.S.C. 154(b) by 1049 days.

(21) Appl. No.: 12/645,669

(22) Filed: Dec. 23, 2009

(65) Prior Publication Data

US 2010/0166510 A1 Jul. 1, 2010

(30) Foreign Application Priority Data

Dec. 25, 2008 (JP) ................................. 2008-331633

(51) Int. Cl.
*B23Q 11/00* (2006.01)
(52) U.S. Cl.
USPC ............................... 407/11; 408/67; 409/137
(58) Field of Classification Search
USPC ............ 408/67, 68, 58, 56, 57, 207; 175/393, 175/417–420.1; 407/11; 409/137
See application file for complete search history.

(56) References Cited

U.S. PATENT DOCUMENTS

| | | | | |
|---|---|---|---|---|
| 1,477,855 | A * | 12/1923 | Thurston | 175/320 |
| 1,927,871 | A * | 9/1933 | Irwin et al. | 73/864.43 |
| 2,556,745 | A * | 6/1951 | Zimmermann | 407/64 |
| 2,802,642 | A * | 8/1957 | Feucht | 175/400 |
| 2,952,270 | A * | 9/1960 | Fulton et al. | 137/360 |
| 3,040,605 | A * | 6/1962 | Andreasson | 408/59 |
| 3,144,912 | A * | 8/1964 | Boehm et al. | 175/213 |
| 3,434,553 | A * | 3/1969 | Weller | 175/420.1 |

(Continued)

FOREIGN PATENT DOCUMENTS

CN 101119828 2/2008
DE 3237721 A1 * 4/1984

(Continued)

OTHER PUBLICATIONS

English translation of DE 202008008561 U1, Bruntner, Sep. 2008, pp. 1-6.*

(Continued)

*Primary Examiner* — Andrea Wellington
*Assistant Examiner* — Sara Addisu
(74) *Attorney, Agent, or Firm* — Kratz, Quintos & Hanson, LLP

(57) ABSTRACT

A tool has a shank and a cutting blade mounted on the shank. The tool also includes an internal fluid passage for drawing in, together with air, chips produced when the cutting blade machines a workpiece. The internal fluid passage comprises a through hole made in the shank, at least one main inlet hole for drawing in the chips together with the air, the main inlet hole being made in the cutting blade and being in fluid communication with the through hole, and at least one sub-inlet hole for drawing in at least the air, the sub-inlet hole being made in the shank and being in fluid communication with the through hole. The chips can efficiently be discharged from the tool without being deposited in the internal fluid passage, by the air which flows at a suitable speed through the internal fluid passage and draws the chips, regardless of the diameter of the tool.

5 Claims, 6 Drawing Sheets

(56) References Cited

U.S. PATENT DOCUMENTS

| | | | |
|---|---|---|---|
| 3,434,554 A * | 3/1969 | Bower, Jr. | 175/420.1 |
| 3,554,306 A * | 1/1971 | Wilburn | 175/320 |
| 3,595,327 A * | 7/1971 | Self | 175/420.1 |
| 3,860,051 A * | 1/1975 | Anson | 144/172 |
| 3,948,330 A * | 4/1976 | Langford, Jr. | 175/339 |
| 4,036,308 A | 7/1977 | Dellenberg | |
| 4,137,002 A * | 1/1979 | Barker et al. | 408/59 |
| 4,165,790 A * | 8/1979 | Emmerich | 175/420.1 |
| 4,190,125 A * | 2/1980 | Emmerich et al. | 175/420.1 |
| 4,190,128 A * | 2/1980 | Emmerich | 175/420.1 |
| 4,313,506 A * | 2/1982 | O'Connell | 175/420.1 |
| 4,515,230 A * | 5/1985 | Means et al. | 175/420.1 |
| 4,852,672 A * | 8/1989 | Behrens | 175/389 |
| 4,911,253 A * | 3/1990 | Cliche | 175/213 |
| 4,964,476 A * | 10/1990 | Fischer | 175/213 |
| 4,989,681 A | 2/1991 | Lohmüller et al. | |
| 5,220,967 A * | 6/1993 | Monyak | 175/420.1 |
| 5,234,294 A * | 8/1993 | Hoppe et al. | 408/67 |
| 5,297,643 A * | 3/1994 | Montgomery et al. | 175/393 |
| 5,400,861 A * | 3/1995 | Sheirer | 175/427 |
| 5,487,630 A | 1/1996 | Campian | 409/225 |
| 6,086,292 A * | 7/2000 | Yokoyama | 408/67 |
| 6,123,489 A * | 9/2000 | Reccius et al. | 408/59 |
| 6,189,633 B1 * | 2/2001 | Kleine et al. | 175/418 |
| 6,234,725 B1 | 5/2001 | Campian | 407/54 |
| 6,427,782 B2 * | 8/2002 | Brady | 175/40 |
| 6,595,305 B1 * | 7/2003 | Dunn et al. | 175/420.1 |
| 7,101,125 B2 * | 9/2006 | Borschert et al. | 408/230 |
| 7,326,009 B2 * | 2/2008 | Lindblom | 408/59 |
| 7,476,067 B2 * | 1/2009 | Borschert et al. | 408/59 |
| 7,563,060 B2 * | 7/2009 | Kesterson et al. | 408/67 |
| 7,963,991 B2 * | 6/2011 | Conner et al. | 623/17.11 |
| 2001/0006121 A1 * | 7/2001 | Kleine et al. | 175/213 |
| 2009/0060670 A1 * | 3/2009 | Sugano et al. | 408/230 |
| 2009/0279964 A1 * | 11/2009 | Hyatt et al. | 408/58 |

FOREIGN PATENT DOCUMENTS

| | | |
|---|---|---|
| DE | 195 12 401 | 4/1996 |
| DE | 103 56 731 B3 | 3/2005 |
| DE | 20 2007 011431 U1 | 11/2007 |
| DE | 202008008561 U1 * | 9/2008 |
| EP | 0 345 815 A2 | 12/1989 |
| EP | 0 738 558 A1 | 10/1996 |
| EP | 2 006 043 A1 | 12/2008 |
| JP | 61136726 A * | 6/1986 |
| JP | 03066509 A * | 3/1991 |
| JP | 2002166320 A * | 6/2002 |
| JP | 2005238403 A * | 9/2005 |
| JP | 2008178941 A * | 8/2008 |
| WO | WO 03/097283 A1 | 11/2003 |

OTHER PUBLICATIONS

English translation of, JP 2005238403 A, Sakamura, Sep. 2005, pp. 1-13.*
European Search Report dated Jan. 7, 2011.
Office Action mailed Nov. 16, 2012 in counterpart application No. 200910262067.1 from The State Intellectual Property Office of P.R. China with English translation.

* cited by examiner

TOOL WITH INTERNAL FLUID PASSAGE

RELATED APPLICATION

The present application claims priority under 35 U.S.C. §119 of Japanese Patent Application No. JP2008-331633, filed on Dec. 25, 2008, the disclosure of which is incorporated herein by reference in its entirety.

BACKGROUND OF THE INVENTION

1. Field of the Invention

The present invention relates to a tool with an internal fluid passage, which is mounted on a machine tool and used to machine a workpiece on the machine tool.

2. Description of the Related Art

Published patent application P2005-532917 (International publication WO2003/097283) discloses a milling tool having a chip outlet passage made therein for discharging, together with air, chips produced when a workpiece is machined by the milling tool.

The milling tool has a gap in a milling head (cutting blade) on its tip end. The chips are produced when the workpiece is machined by the milling tool. The chips are drawn through the gap into the chip outlet passage and are discharged from the chip outlet passage.

If the milling tool disclosed in P2005-532917 has a large tool diameter, then the gap is also of a large size, and hence the amount of air which is drawn through the gap is large. As a result, air flows at a high speed in the chip outlet passage. Air draws the chips therewith into the chip outlet passage and discharges the chips well through the chip outlet passage.

If the milling tool has a small tool diameter, then since the gap has a correspondingly small cross-sectional area, the amount of air flowing through the gap is low and hence air flows at a low speed in the chip outlet passage, so that attractive forces for drawing in the chips are reduced. As a result, the chips drawn together with air from the gap tend to be progressively deposited in the chip outlet passage. The deposited chips may not easily be cleared from the chip outlet passage.

SUMMARY OF THE INVENTION

It is an object of the present invention to provide a tool with an internal fluid passage for discharging the chips therethrough without being deposited therein with air which flows at a suitable speed in the internal fluid passage to draw in the chips, regardless of the diameter of the tool.

To achieve the above object, there is provided a tool with an internal fluid passage, in accordance with the present invention, the tool comprising: a shank; a cutting blade mounted on the shank; and an internal fluid passage for drawing in, together with air, chips produced when the cutting blade machines a workpiece;

wherein the internal fluid passage made in the tool comprises:

a through hole made in the shank;

at least one main inlet hole for drawing in the chips together with the air, the main inlet hole being made in the cutting blade and being in fluid communication with the through hole; and at least one sub-inlet hole for drawing in at least the air, the sub-inlet hole being made in the shank and being in fluid communication with the through hole.

Preferably, the sub-inlet hole has a sub-central axis which is inclined a predetermined angle to a main central axis of the through hole, and the air, which flows through the sub-inlet hole, flows obliquely to and joins the air flowing through the through hole.

Preferably, the internal fluid passage comprises a plurality of sub-inlet holes which are equally angularly spaced in a circumferential direction of the shank, and the sub-inlet holes have respective sub-central axes crossing the main central axis of the through hole at a single point thereon.

Preferably, the internal fluid passage comprises a plurality of sub-inlet holes which are spaced at equal angular intervals in a circumferential direction of the shank, and the sub-inlet holes have respective sub-central axes which are equally angularly spaced from the main central axis of the through hole and are angularly staggered with respect to each other.

Preferably, the shank comprises: a smaller-diameter portion on which the cutting blade is mounted; a larger-diameter portion mounted on a tool holder; and a tapered portion disposed between the smaller-diameter portion and the larger-diameter portion; wherein the sub-inlet holes are open at the tapered portion and are equally angularly spaced in a circumferential direction of the shank.

Preferably, the sub-inlet hole comprises a plurality of sub-inlet holes, and the sub-inlet holes have respective cross-sectional areas set to values corresponding to cross-sectional area of the main inlet hole.

The tool with the internal fluid passage according to the present invention is constructed as described above. Accordingly, the tool with the internal fluid passage is capable of effectively discharging the chips through the internal fluid passage without being deposited therein with air which flows at a suitable speed in the internal fluid passage to draw in the chips, regardless of the diameter of the tool.

DESCRIPTION OF THE PREFERRED EMBODIMENT

Figure 1:
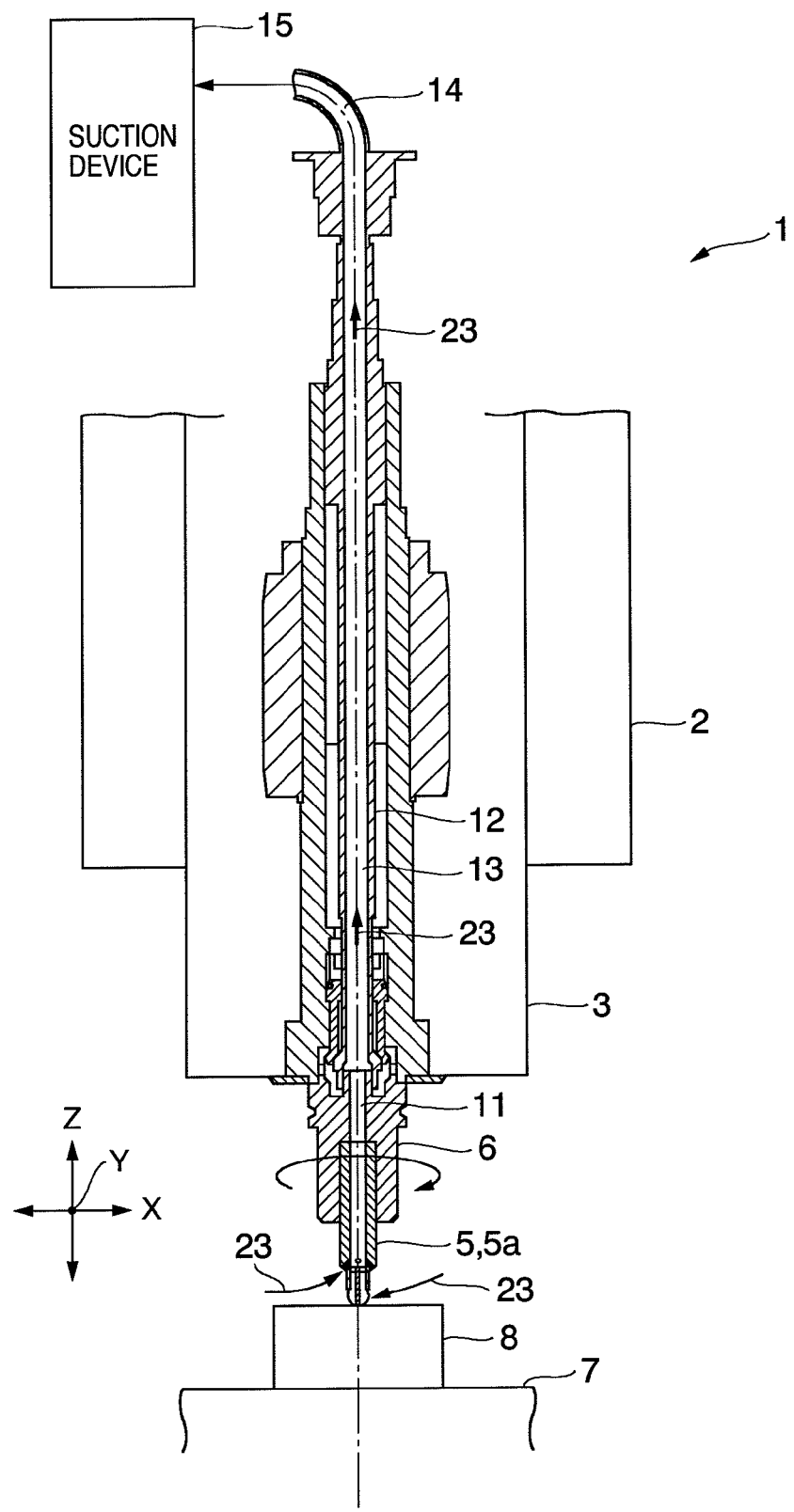
FIG. 1 is a partly cross-sectional view of a machining center, showing the manner in which the machining center machines a workpiece with a tool with an internal fluid passage according to an embodiment of the present invention.

A tool with an internal fluid passage according to the present invention has a shank for holding a cutting blade. The internal fluid passage is made in the tool for drawing in, together with air, chips which are produced when the cutting blade machines a workpiece.

The internal fluid passage comprises a through hole made in the shank, at least one main inlet hole and at least one sub-inlet hole. The main inlet hole is made, in the cutting blade, for drawing in the chips together with air, and is in fluid communication with a through hole made in the shank. The sub-inlet hole is made, in the shank, for drawing in at least air (specifically both air and the chips, or air) and is in fluid communication with the through hole.

The tool with the internal fluid passage thus constructed is capable of achieving the object of the present invention, i.e., is capable of effectively discharging the chips through the internal fluid passage without being deposited therein with air which flows at a suitable speed in the internal fluid passage to draw in the chips, regardless of the diameter of the tool.

The tool with the internal fluid passage according to the present invention may comprise a tool for use on a machining center, e.g., a rotating tool, or a rotating tool for use on a machine tool such as a lathe, a multi-axis turning center, a turning machine, or the like, or a turning tool which does not rotate.

An embodiment of the present invention will be described in detail below with reference to FIGS. 1 through 6.

Identical or corresponding reference characters denote identical or corresponding parts throughout views.

Figure 2:
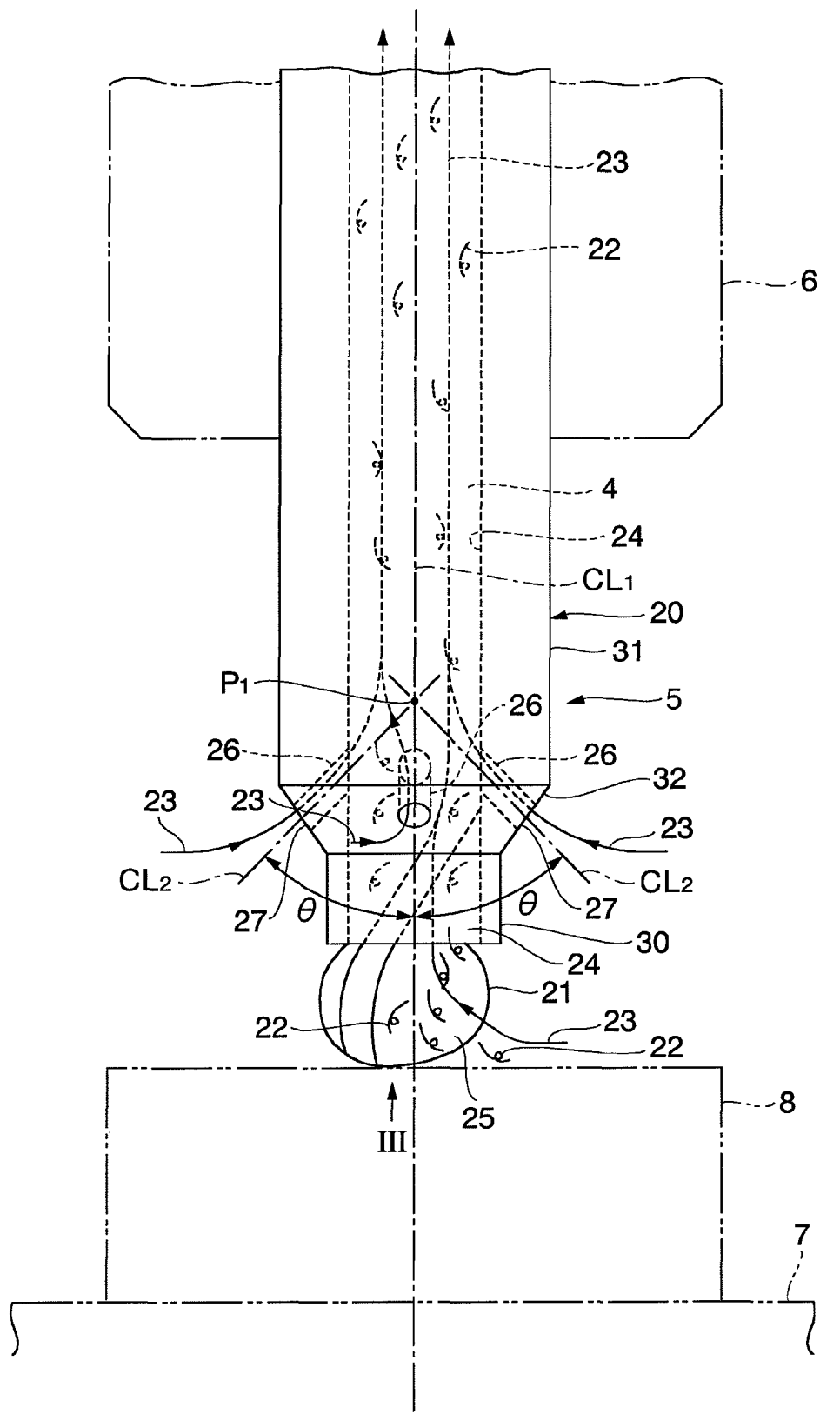
FIG. 2 is an enlarged fragmentary elevational view of the tool with the internal fluid passage according to the present invention.
Figure 3:
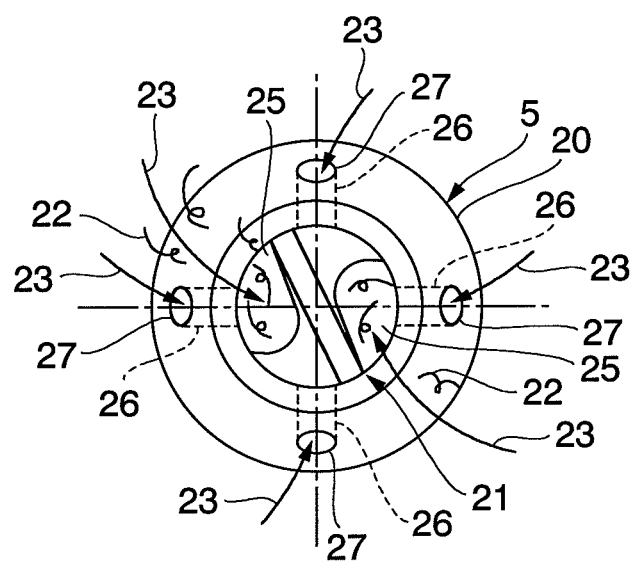
FIG. 3 is a view as seen in the direction indicated by the arrow III in FIG. 2.
Figure 4:
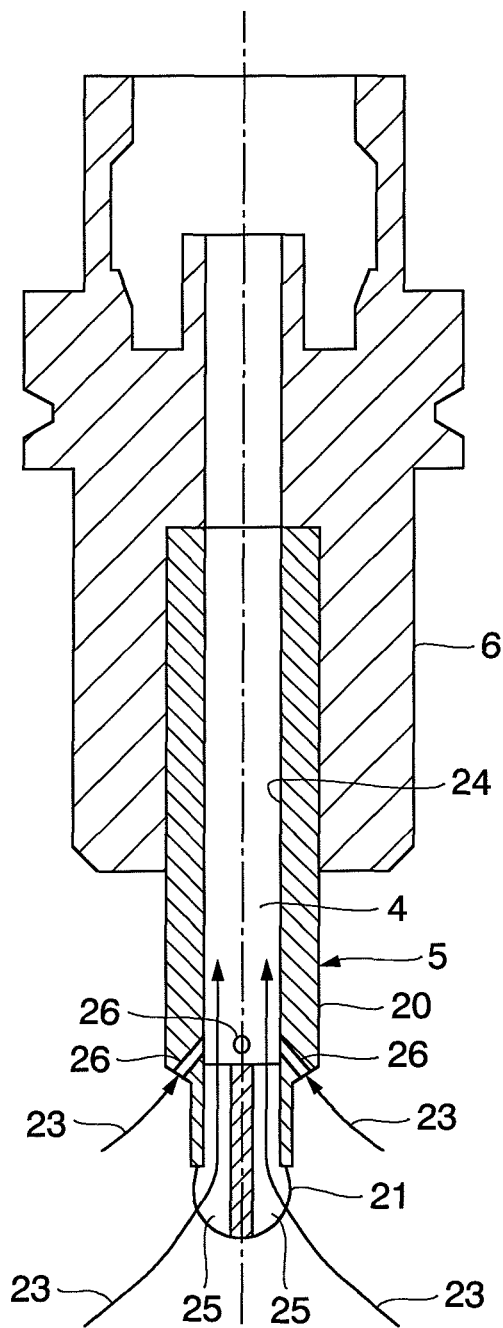
FIG. 4 is an enlarged transverse cross-sectional view of the tool with the internal fluid passage shown in FIG. 2.
Figure 5:
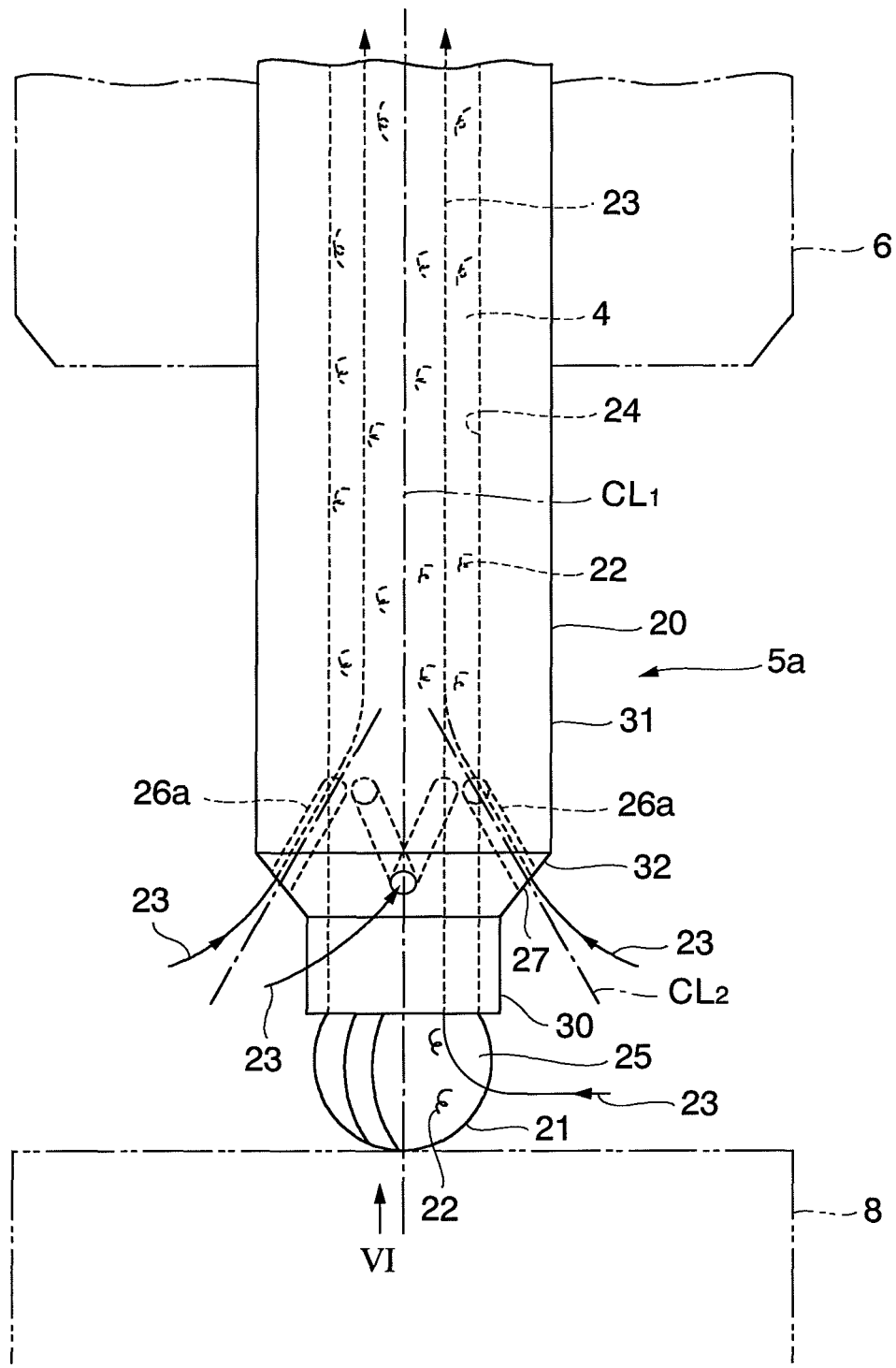
FIG. 5 is an enlarged fragmentary elevational view of a tool with an internal fluid passage according to a modification of the present invention.
Figure 6:
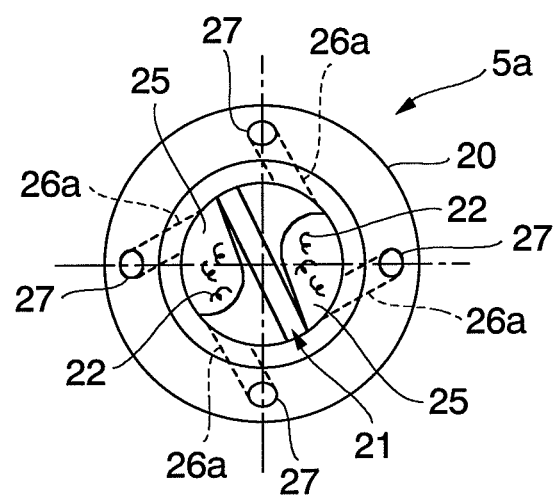
FIG. 6 is a view as seen in the direction indicated by the arrow VI in FIG. 5.

FIG. 1 is a partly cross-sectional view of a machining center, showing the manner in which the machining center machines a workpiece with a tool 5, 5a with an internal fluid passage according to an embodiment of the present invention. FIG. 2 is an enlarged fragmentary elevational view of the tool 5 with the internal fluid passage according to the present invention, FIG. 3 is a view as seen in the direction indicated by the arrow III in FIG. 2, FIG. 4 is an enlarged transverse cross-sectional view of the tool 5 with the internal fluid passage shown in FIG. 2, FIG. 5 is an enlarged fragmentary elevational view of with the tool 5a with an internal fluid passage according to a modification of the present invention and FIG. 6 is a view as seen in the direction indicated by the arrow VI in FIG. 5.

As shown in FIGS. 1 through 6, a machine tool 1 according to the embodiment of the present invention is in the form of a machining center. The machine tool 1 includes a spindle head 2 and a main spindle 3 rotatably supported by the spindle head 2. The tool 5 (or the tool 5a), which has an internal fluid passage 4 made therein, is mounted on a tool holder 6 detachably mounted on the main spindle 3. In operation, the tool 5, 5a is rotated by the main spindle 3 to cut a workpiece 8 which is placed on a table 7.

The tool 5, 5a includes a shank 20 holding a cutting blade 21 thereon. The internal fluid passage 4 is made in the tool 5, 5a for drawing in, together with air 23, chips 22 which are produced when the workpiece 8 is machined by the cutting blade 21.

The internal fluid passage 4 made in the tool 5, 5a comprises a through hole 24 made in the shank 20, at least one main inlet hole 25 (two main inlet holes 25 in the illustrated embodiment), and at least one sub-inlet hole 26 (or sub-inlet hole 26a) (four sub-inlet holes 26, 26a in the illustrated embodiment).

The main inlet holes 25 are made, in the cutting blade 21, for drawing in the chips 22 together with the air 23 and are in fluid communication with the through hole 24. The sub-inlet holes 26 (or the sub-inlet holes 26a) are made, in the shank 20, for drawing in the chips 22 together with the air 23 or only the air 23 and are in fluid communication with the through hole 24.

The air 23 and the chips 22, which have passed through the internal fluid passage 4 in the tool 5, 5a, flow successively through a fluid passageway 11 made in the tool holder 6, a fluid passageway 13 made in a drawbar 12 of the main spindle 3, and a discharge fluid passageway 14 made in the main spindle 3 and the spindle head 2, and then the air 23 and the chips 22 flow into a suction device 15.

The suction device 15 includes a vacuum pump for drawing in the air 23 and the chips 22 through the tool 5, 5a, and a trapping unit for trapping the chips 22 carried by the air 23.

If the tool 5, 5a has a large diameter, then since the main inlet holes 25 have a large cross-sectional area, a large amount of air 23 flows in from the main inlet holes 25. As a result, the air 23 which contains the chips 22 flows through the internal fluid passage 4 at a high speed and exerts strong suction forces. Accordingly, the chips 22 can thus be well discharged from the internal fluid passage 4 without being deposited therein.

Conversely, if the tool 5, 5a has a small diameter, then since the main inlet holes 25 have a small cross-sectional area, a small amount of air 23 flows in from the main inlet holes 25. Generally, the through hole 24 has a larger cross-sectional area than the main inlet holes 25. As a consequence, the speed of the air 23 and the chips 22 flowing from the main inlet holes 25 into the through hole 24 is reduced in the through hole 24, so that the chips 22 are likely to be deposited in the through hole 24.

According to the present invention, the sub-inlet holes 26, 26a are made in the shank 20 of the tool 5, 5a. At least the air 23 (i.e., the air 23 which contains the chips 22 or the air 23 which does not contain the chips 22) is drawn in through the sub-inlet holes 26, 26a, and joins the air 23 in the through hole 24.

As a result, the speed of the air 23 in the internal fluid passage 4 increases to produce appropriate suction forces. The chips 22, which have been introduced together with the air 23 from the main inlet holes 25, are now caused to flow together with the air 23 flowing at the increased speed.

Therefore, the tool 5, 5a is capable of effectively discharging the chips 22 through the internal fluid passage 4 without being deposited therein with the air 23 which flows at a suitable speed in the internal fluid passage 4 to draw in the chips 22, regardless of the diameter of the tool 5, 5a.

Each of the sub-inlet holes 26, 26a has a sub-central axis CL2 which is inclined a predetermined angle θ (preferably θ=10 degrees) to the main central axis CL1 of the through hole 24. The air 23, e.g., the air 23 containing the chips 22, which flows through the sub-inlet holes 26, 26a, flows obliquely to and joins the air 23 flowing through the through hole 24.

Since the sub-inlet holes 26, 26a are inclined to the through hole 24, the air 23 and the chips 22 which flow through the sub-inlet holes 26, 26a smoothly join the air 23 flowing through the through hole 24. Consequently, the air 23 is not likely to flow back in the through hole 24, and hence the chips 22 are not likely to remain trapped and to be deposited in the through hole 24.

In the tool 5 shown in FIGS. 1 through 4, the internal fluid passage 4 comprises a plurality of sub-inlet holes 26. The four sub-inlet holes 26 are spaced at equal angular intervals in the circumferential direction of the shank 20. The sub-central axes CL2 of the sub-inlet holes 26 cross the main central axis CL1 of the through hole 24 at a single point P1 thereon. Though the sub-central axes CL2 of the sub-inlet holes 26 are normally represented by straight lines, they may be represented by curved lines.

The tool 5 allows the air 23 and the chips 22 which flow through the sub-inlet holes 26 to effectively join the air 23 flowing through the through hole 24. Therefore, the air 23 and the chips 22 are less liable to flow back and to remain trapped. Rather, the air 23 and the chips 22 flow downstream through the internal fluid passage 4 and then are smoothly discharged out of the internal fluid passage 4.

Though the sub-inlet holes 26 made in the tool 5 normally have the same diameter, they may have different diameters. For example, of the four sub-inlet holes 26 which are equally angularly spaced at 90-degree intervals, two sub-inlet holes 26 which are angularly spaced apart from each other by 180 degrees may have a larger diameter, and the remaining two sub-inlet holes 26 which are also angularly spaced apart from each other by 180 degrees may have a smaller diameter. Furthermore, the internal fluid passage 4 may include two or more sub-inlet holes 26.

FIGS. 1, 5 and 6 show the tool 5a according to a modification of the present invention. In the tool 5a, the internal fluid passage 4 includes a plurality of sub-inlet holes 26a (four sub-inlet holes 26a in the illustrated embodiment) which are spaced at equal angular intervals in the circumferential direction of the shank 20.

The sub-inlet holes 26a have respective sub-central axes CL2 which are equally angularly spaced from the main central axis CL1 of the through hole 24. The sub-central axes CL2 of the respective sub-inlet holes 26a are angularly staggered with respect to each other. Specifically, the sub-central axes CL2 of the respective sub-inlet holes 26a do not cross the main central axis CL1 of the through hole 24, and do not extend parallel to each other and do not cross each other. Though the sub-central axes CL2 of the sub-inlet holes 26a are normally represented by straight lines, they may be represented by curved lines.

As described above, the sub-central axes CL2 of the respective sub-inlet holes 26a in the tool 5a are equally angularly spaced from the main central axis CL1 of the through hole 24, and are angularly staggered with respect to each other. When the air 23 and the chips 22, which have passed through the sub-inlet holes 26a, flow into the through hole 24 and join the air 23 flowing through the through hole 24, they produce swirling vortexes in the through hole 24.

The chips 22 carried by the air 23 are drawn into the through hole 24 by the swirling vortexes, and flow downstream through the internal fluid passage 4 and then are smoothly discharged out of the internal fluid passage 4. Since the swirling vortexes produced in the internal fluid passage 4 move downstream through the internal fluid passage 4, the air 23 and the chips 22 are less liable to flow back and to remain trapped because they are drawn under attractive forces of the swirling vortexes.

Though the sub-inlet holes 26a made in the tool 5a normally have the same diameter, they may have different diameters. For example, of the four sub-inlet holes 26a which are equally angularly spaced at 90-degree intervals, two sub-inlet holes 26a which are angularly spaced apart from each other by 180 degrees may have a larger diameter, and the remaining two sub-inlet holes 26a which are also angularly spaced apart from each other by 180 degrees may have a smaller diameter. Furthermore, the internal fluid passage 4 may include two or more sub-inlet holes 26a.

According another modification, a tool has a plurality of sub-inlet holes (for example, four sub-inlet holes) as a combination of sub-inlet holes 26 of the tool 5 and sub-inlet holes 26a of the tool 5a.

For example, of the four sub-inlet holes which are equally angularly spaced at 90-degree intervals, two opposite sub-inlet holes 26 are angularly spaced apart from each other by 180 degrees in the circumferential direction of the shank 20. These two opposite sub-inlet holes 26 have respective sub-central axes CL2 crossing the main central axis CL1 at one point P1.

The remaining two opposite sub-inlet holes 26 are angularly spaced apart from each other by 180 degrees in the circumferential direction of the shank 20. These two opposite sub-inlet holes 26 have respective sub-central axes CL2 are equally angularly spaced from the main central axis CL1 of the through hole 24 and are angularly staggered with respect to each other. Specifically, the sub-central axes CL2 of the respective sub-inlet holes 26a do not cross the main central axis CL1 of the through hole 24, and do not extend parallel to each other and do not cross each other.

The tool according to this modification operates in the same manner as and offers the same advantages as the tools 5, 5a.

In order for the tools 5, 5a shown in FIGS. 1 and 6 to prevent the chips 22 from remaining trapped in the through hole 24 in a smaller-diameter portion 30 (to be described below) of the shank 20, the sub-inlet holes 26, 26a are disposed as closely to the cutting blade 21 as possible. The sub-inlet holes 26, 26a thus positioned are effective to prevent the chips 22 drawn from the main inlet holes 25 from being deposited in the through hole 24, in the smaller-diameter portion 30, which has wider cross-sectional area than the main inlet holes 25.

The shank 20 includes the smaller-diameter portion 30 on which the cutting blade 21 is mounted, a larger-diameter portion 31 mounted on the tool holder 6, and a tapered portion 32 disposed between the smaller-diameter portion 30 and the larger-diameter portion 31. The sub-inlet holes 26, 26a are open at the tapered portion 32 and are equally angularly spaced in the circumferential direction of the shank 20.

Specifically, the sub-inlet holes 26, 26a have respective openings 27 made in the tapered portion 32. Therefore, the sub-inlet holes 26, 26a can be drilled perpendicularly or nearly perpendicularly to the surface of the tapered portion 32. As a result, it is easy and efficient to form the sub-inlet holes 26, 26a in the shank 20.

The sub-inlet holes 26, 26a have respective cross-sectional areas set to values corresponding to the cross-sectional area of the main inlet holes 25. Accordingly, the amounts of air 23 flowing in from the sub-inlet holes 26, 26a can be set to appropriate values depending on the diameters of the tools 5, 5a.

As a consequence, the attractive forces for drawing in the chips 22 depending on the speed of the air 23 flowing through the internal fluid passage 4 are optimized to effectively discharge the chips 22 without being deposited in the internal fluid passage 4.

Operation of the machine tool 1 will be described below with reference to FIGS. 1 through 6.

The tool 5, 5a held by the tool holder 6 is rotated about its own axis by the main spindle 3 mounted on the spindle head 2. The workpiece 8 fixedly placed on the table 7 is not rotated. At this time, the suction device 15 is actuated.

Since the suction device 15 is actuated, it draws in air 23 from the two main inlet holes 25 in the cutting blade 21 and the four sub-inlet holes 26, 26a in the shank 20. The air 23 flows through the through hole 24 in the shank 20, then flows successively through the fluid passageway 11 made in the tool holder 6, the fluid passageway 13 made in the drawbar 12, and the discharge fluid passageway 14 made in the main spindle 3 and the spindle head 2, and then is discharged out by the suction device 15.

The rotating tool 5, 5a is relatively moved in the three mutually transverse axes directions (X-axis, Y-axis, Z-axis) with respect to the workpiece 8 in physical interference with the workpiece 8, thereby cutting the workpiece 8. While the workpiece 8 is cut by the tool 5, 5a, the cutting blade 21 produces the chips 22 from the workpiece 8.

The chips 22 thus produced from the workpiece 8 are drawn, together with the air 23, into the main inlet holes 25 in the cutting blade 21. The chips 22 pass through the main inlet holes 25 and enter the through hole 24 in the shank 20.

While the cutting blade 21 of the tool 5, 5a is not cutting the workpiece 8, it temporarily does not produce the chips 22 from the workpiece 8. At this time, any chips 22 contained in the air 23 drawn in from the main inlet holes 25 are few or nil. Therefore, almost only the air 23 flows through the main inlet holes 25.

Part of the chips 22 produced when the cutting blade 21 machines the workpiece 8 may be drawn, together with the air 23, into the sub-inlet holes 26, 26a, and flow through the sub-inlet holes 26, 26a into the through hole 24 in the shank 20. The air 23 which flows through the sub-inlet holes 26, 26a may not contain the chips 22 at all times.

In this manner, the chips 22 flow, together with the air 23, into the through hole 24 in the shank 20. The chips 22 are then carried by the air 23 to flow successively through the fluid passageway 11 made in the tool holder 6, the fluid passageway 13 made in the drawbar 12, and the discharge fluid passageway 14 made in the main spindle 3 and the spindle head 2, and then are discharged out by the suction device 15. The chips 22 are then trapped by the suction device 25. As no chips are contained in the air which is discharged from the suction device 25, the air discharged from the suction device 25 is clean.

In the tool 5, 5a, the through hole 24 is greater in cross-sectional area than the main inlet holes 25. Therefore, when the air 23 and the chips 22 flow from the main inlet holes 25 into the through hole 24, the speed of the air 23 and the chips 22 is lowered.

The air 23, which may contain the chips 22, is also drawn through the sub-inlet holes 26, 26a into the through hole 4 separately from the air 23 flowing through the main inlet holes 25. Therefore, the speed of the air 23 flowing through the main inlet holes 25 into the through hole 24 is immediately increased by the air 23 added from the sub-inlet holes 26, 26a, exerting strong attractive forces to the chips 22 contained in the air 23. As a result, the chips 22 contained in the air 23 are forced to flow downstream without being trapped and deposited in the through hole 24.

The tool with the internal fluid passage according to the present invention is applicable to a rotating tool for use on a machine tool such as a lathe, a multi-axis turning center, a turning machine, or the like, or a turning tool which does not rotate, in addition to a tool for use on a machining center.

Although a certain preferred embodiment and modifications of the present invention have been shown and described in detail, it should be understood that the present invention is not limited to the illustrated embodiment and modifications, but various changes and modifications may be made therein without departing from the scope of the appended claims.

What is claimed is:

1. A tool with an internal fluid passage, said tool comprising:
    a shank;
    a cutting blade mounted on said shank; and
    an internal fluid passage for drawing in, together with air, chips produced when the cutting blade machines a workpiece;
    wherein said internal fluid passage made in said tool comprises:
    a through hole made in said shank;
    at least one main inlet hole for drawing in said chips together with said air, said main inlet hole being made in said cutting blade and being in fluid communication with said through hole; and
    at least one sub-inlet hole for drawing in at least said air, said sub-inlet hole being made in said shank and being in fluid communication with said through hole,
    said through hole has a larger cross-sectional area than said main inlet hole,
    said sub-inlet hole has a sub-central axis (CL2) which is inclined a predetermined angle to a main central axis (CL1) of said through hole,
    said air, which flows through said sub-inlet hole, flows obliquely to and joins said air flowing through said through hole, and
    said sub-inlet hole extends from an opening in said shank toward said through hole, said opening being side-by-side with said main inlet hole in directions radially from said main central axis of said through hole.

2. A tool according to claim 1, wherein said internal fluid passage comprises a plurality of sub-inlet holes which are equally angularly spaced in a circumferential direction of said shank, and said sub-inlet holes have respective sub-central axes crossing said main central axis of said through hole at a single point thereon.

3. A tool according to claim 1, wherein said internal fluid passage comprises a plurality of sub-inlet holes which are spaced at equal angular intervals in a circumferential direction of said shank, and said sub-inlet holes have respective sub-central axes which are equally angularly spaced from the main central axis of said through hole and are angularly staggered with respect to each other.

4. A tool according to claim 1, wherein said shank comprises:
    a smaller-diameter portion on which said cutting blade is mounted;
    a larger-diameter portion mounted on a tool holder; and
    a tapered portion disposed between said smaller-diameter portion and said larger-diameter portion;
    wherein said sub-inlet holes are open at said tapered portion and are equally angularly spaced in a circumferential direction of said shank.

5. A tool according to claim 1, wherein said sub-inlet hole comprises a plurality of sub-inlet holes, and said sub-inlet holes have respective cross-sectional areas set to values corresponding to cross-sectional area of said main inlet hole.

* * * * *